US012482962B2

(12) United States Patent
Lechner et al.

(10) Patent No.: US 12,482,962 B2
(45) Date of Patent: Nov. 25, 2025

(54) ELECTRIC TERMINAL, TERMINAL ASSEMBLY, CONNECTOR ASSEMBLY AND METHOD FOR MANUFACTURING THE TERMINAL ASSEMBLY

(71) Applicant: Knorr-Bremse Systeme Fuer Nutzfahrzeuge GmbH, Munich (DE)

(72) Inventors: Klaus Lechner, Pretzfeld (DE); Sagar Kumbhar, Pune (IN); Himanshu Kudalkar, Pune (IN); Swanand Deshpande, Pune (IN); Pankaj Ingale, Pune (IN)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 412 days.

(21) Appl. No.: 18/051,065

(22) Filed: Oct. 31, 2022

(65) Prior Publication Data

US 2023/0155309 A1 May 18, 2023

(30) Foreign Application Priority Data

Nov. 17, 2021 (EP) .................................... 21208785

(51) Int. Cl.
*H01R 12/58* (2011.01)

(52) U.S. Cl.
CPC .................................... *H01R 12/58* (2013.01)

(58) Field of Classification Search
CPC ...... H01R 12/58; H01R 12/91; H01R 13/405; H01R 13/05; H01R 13/2414; H01R 24/00
See application file for complete search history.

(56) References Cited

U.S. PATENT DOCUMENTS

| | | | | |
|---|---|---|---|---|
| 4,778,404 A * | 10/1988 | Pass | H01R 13/2428 439/948 |
| 5,122,066 A * | 6/1992 | Plossmer | H01R 12/716 439/246 |
| 5,888,096 A * | 3/1999 | Soes | H01R 13/6586 439/857 |
| 5,967,856 A * | 10/1999 | Meller | H01R 13/2428 439/700 |
| 6,783,405 B1 * | 8/2004 | Yen | H01R 12/58 439/700 |

(Continued)

FOREIGN PATENT DOCUMENTS

| | | |
|---|---|---|
| EP | 0718919 A1 | 6/1996 |
| JP | 2014067550 A | 4/2014 |
| JP | 2015056367 A | 3/2015 |

*Primary Examiner* — Truc T Nguyen
(74) *Attorney, Agent, or Firm* — NORTON ROSE FULBRIGHT US LLP

(57) ABSTRACT

An electric terminal for an electric connection of a device in a connector-to-counter-connector configuration, including: a device contact terminal end, a counter-connector terminal end, and an intermediate portion between the device contact terminal end and the counter-connector terminal end, in which the electric terminal extends from the device contact terminal end to the counter-connector terminal end in a main direction, and in which the intermediate portion includes at least two turning points to deflect the extension of the electric terminal at least once from the main direction.

18 Claims, 3 Drawing Sheets

(56) References Cited

U.S. PATENT DOCUMENTS

| | | | | |
|---|---|---|---|---|
| 6,859,054 | B1 * | 2/2005 | Zhou | G01R 1/07314 257/781 |
| 6,967,492 | B2 * | 11/2005 | Tsui | G01R 1/06733 324/755.05 |
| 10,312,613 | B2 * | 6/2019 | Taylor | H05K 7/023 |
| 2002/0142669 | A1 * | 10/2002 | Phillips | H01R 13/2428 439/700 |
| 2003/0203660 | A1 * | 10/2003 | Kassa | H05K 7/1084 439/65 |
| 2005/0110505 | A1 * | 5/2005 | Stanley Tsui | G01R 1/06733 324/755.05 |
| 2009/0026050 | A1 | 1/2009 | Tominaga et al. | |
| 2009/0111289 | A1 * | 4/2009 | Vinther | H01R 12/714 439/81 |
| 2010/0317235 | A1 * | 12/2010 | Kiryu | H01R 13/112 439/660 |
| 2012/0120470 | A1 * | 5/2012 | Kitazawa | B81B 3/0045 359/221.3 |
| 2013/0035003 | A1 * | 2/2013 | Frank | H01R 13/112 439/750 |
| 2023/0187879 | A1 * | 6/2023 | Tamai | H01R 13/405 439/108 |
| 2023/0420874 | A1 * | 12/2023 | Dunham | H01R 12/58 |

* cited by examiner

ELECTRIC TERMINAL, TERMINAL ASSEMBLY, CONNECTOR ASSEMBLY AND METHOD FOR MANUFACTURING THE TERMINAL ASSEMBLY

RELATED APPLICATION INFORMATION

The present application claims priority to and the benefit of European patent application no. 21 208 785.2, which was filed in the European Patent Office on Nov. 17, 2021, the disclosure of which is incorporated herein by reference.

FIELD OF THE INVENTION

The present invention relates to an electric terminal, a terminal assembly and a connector assembly for an electric connection of a device in a connector-to-counter-connector configuration as well as a method for manufacturing the terminal assembly.

BACKGROUND INFORMATION

Electric terminals for an electric connection of a device in a connector-to-counter-connector configuration are, for example, used in a connector assembly to provide an electrical connection between contacts of a printed circuit board and a HDSCS connector as counter-connector. Due to thermal expansions and/or axial movement of such electric terminals, a reliable contact may not be ensured and/or the electric terminals may apply undesired forces on contacted components. To reduce the risk of axial movements, some electric terminals provide several comparably thin projections, such as ribs, extending in a radial direction with respect to a longitudinal extension of such electric terminal, known as Christmas tree features. However, to securely hold such thin projections in a mold or the like, the projections require a minimum length not always available due to space constraints. Additionally, the respective shape does not provide any contribution to reduce thermal expansions.

SUMMARY OF THE INVENTION

In view of the above, it is an object of the present invention to provide an electric terminal, a terminal assembly and a connector assembly for an electric connection of a device in a connector-to-counter-connector configuration as well as a method for manufacturing the terminal assembly allowing an improved contact reliability with respect to an electric connection of a device in a connector-to-counter-connector configuration.

The object is solved by an electric terminal as described herein, a terminal assembly as described herein, a connector assembly as described herein and a method for manufacturing a terminal assembly as described herein. Further aspects of the present invention are as further described herein.

According to the present invention, an electric terminal for an electric connection of a device in a connector-to-counter-connector configuration comprises a device contact terminal end, a counter-connector terminal end and an intermediate portion between the device contact terminal end and the counter-connector terminal end. The electric terminal extends from the device contact terminal end to the counter-connector terminal end in a main direction, and the intermediate portion comprises at least two turning points to deflect the extension of the electric terminal at least once from the main direction.

The device contact terminal end is intended to be positioned in electric contact with a device contact, for example, an electric contact of a printed circuit board as an exemplary device. The counter-connector terminal end as the other end of the electric terminal is intended to be positioned in electric contact with a counter-connector contact, for example, by being received in a socket of a HDSCS connector as exemplary counter-connector. The main direction, in which the electric terminal extends from the device contact terminal end to the counter-connector terminal end, represents a virtual direct connection, i.e. a straight line, between the device contact terminal end and the counter-connector terminal end. The electric terminal does not necessarily have to physically extend at least partially along the main direction. In other words, the electric terminal may but not have to extend physically at least partially along the main direction but the extension of the electric terminal is oriented in such main direction.

The intermediate portion between the device contact terminal end and the counter-connector terminal end may allow at least partial compensation of a thermal expansion of the electric terminal and/or securing the electric terminal against an axial displacement in the main direction. Due to the at least two turning points the electric terminal at least once extends in a direction different from the main direction. Accordingly, an axial displacement of the electric terminal in the main direction in a connector-to-counter-connector configuration may be prevented by using at least one of the at least turning points as in a fixation portion, for example, by embedding the at least one of the at least two turning points of a mold portion as described later with respect to a terminal assembly. Alternatively, other form-fit fixations may be applied on the at least one of the at least two turning points. Alternatively or in addition, a thermal expansion of the electric terminal may be at least partially compensated, for example, by the at least two turning points being displaced in the event of a thermal expansion. For example, the electric terminal end may be provided in a z-shape with the electric terminal extending from the device contact terminal end in a first direction to the intermediate portion with a first turning point deflecting the electric terminal, for example, by 90° in a second direction. At a second turning point of the intermediate portion, the electric terminal is again deflected, for example, by 90° to further extend to the counter-connector terminal end in the first direction. With the first direction being mainly relevant with respect to the electric connection of a device in a connector-to-counter-connector configuration and the device contact terminal end and the counter-connector terminal end being clamped between the device and the counter-connector in the main direction, the first turning point may be displaced towards the counter-connector terminal end and the second turning point is displaced towards the device contact terminal end. The electric terminal portion between the first turning point and second turning point is thereby moved to be inclined with respect the former angles of 90°. When using the intermediate portion for a compensating thermal expansion and to reduce the risk of axial displacements, the fixation portion has to be configured to provide sufficient space for an at least partially free movement required to allow the compensation of thermal expansions.

In some embodiments, the intermediate portion is at least partially flexible in the main direction.

Accordingly, a compensation of a thermal expansion of the electric terminal may therefore, alternatively or in addition to the displacement of at least one of the at least two turning points, be provided by an elastic deformation of at least a part of the intermediate portion. The flexibility to allow a respective elastic deformation may be provided by the elastic properties according to material selection for the electric terminal or at least the respective portion of the intermediate portion, the dimensions of the respective portion of the intermediate portion and/or the shape of the respective portion of the intermediate portion. For example, the respective portion of the intermediate portion may be provided as a flexure bearing, flexible in the main direction. The ability for an elastic deformation may correspond at least to the expected thermal expansion according to a given application in terms of expected temperatures and thermal expansion coefficients to be considered.

Turning back to the previous example of a z-shaped electric terminal, the electric terminal portion between the first turning point and the second turning point may be configured as thin stripe to elastically flex in the main direction with respect to the first turning point and/or the second turning point.

In some embodiments, the intermediate portion is a meander portion comprising at least one meander deflecting the extension of the electric terminal away from and back towards the main direction.

Such meander portion in configured to operate like a spring member to be compressed in the main direction due to thermal expansion of the electric terminal when the device contact terminal end and the counter-connector terminal end are clamped between the device and the counter-connector in the main direction. With a plurality of meanders subsequent in the main direction, the ability to compensate for thermal expansions may be further enhanced. For example, a plurality of subsequent meanders may increase the ability to compensate for thermal expansions without increasing the required radial space with respect to the main direction in comparison to one meander. Alternatively or in addition, a plurality of subsequent meanders may require less flexibility of each meander in comparison to one single meander, which may allow another material selection and/or other dimensions and/or other shapes.

Alternatively or in addition, the meander portion may also enhance a resistance against an axial displacement in the main direction when being positioned in a fixation portion of the electric terminal as previously addressed and further described in detail with respect to the terminal assembly.

In some embodiments, the device contact terminal end and the counter-connector terminal end are on the same axis extending in parallel to the main direction, which may be a symmetry axis of the at least one meander.

Accordingly, the electric terminal may be compressed by a thermal expansion of the electric terminal in the main direction when the device contact terminal end and the counter-connector terminal end are clamped between the device and the counter-connector in the main direction. In other words, the electric terminal is less prone to deflect from the main direction when being compressed. Consequently, the electric terminal remains a sufficient stiffness against an excessive compression, which may otherwise result in plastic deformation.

In some embodiments, the electric terminal comprises at least one shoulder portion between the intermediate portion and the counter-connector terminal end, and the at least one shoulder portion projects in radial direction with respect to the main direction.

The at least one shoulder portion differs from the known thin rib-like projections in that the shoulder associated with the electric terminal and not a thin radial projection extending from the electric terminal as discernible independent geometry feature. In other words, the at least shoulder portion forms a step from a portion of the electric terminal with a larger diameter or width to a portion of the electric terminal with a smaller diameter or width. For example, the electric terminal may extend from the counter-connector terminal end in the main direction with a first diameter or width followed by an electric terminal portion with a second diameter or width smaller than the first diameter or width whereby a shoulder portion is formed. In another variant, the electric terminal may provide two shoulder portions. For example, a first shoulder portion is formed by the electric terminal extending from the counter-connector terminal end in the main direction with a first diameter or width followed by an electric terminal portion the a second diameter or width larger than the first diameter or width. In the given example, a second shoulder portion is formed by the electric terminal portion with the second diameter or width followed by a further electric terminal portion in the main direction towards the device contact terminal end with a third diameter of width smaller than the second diameter or width. The third diameter or width may be equal to the first diameter or width.

The at least one shoulder portion allows a form-fit fixation when being positioned in a fixation portion of the electric terminal as previously addressed and further described in detail with respect to the terminal assembly. While one shoulder portion may only provide a fixation against an axial displacement in one axial direction, at least two should portions may allow a fixation against a bidirectional axial displacement.

The at least one shoulder portion may also be assumed as an inventive concept per se and may therefore form basis for further claims independent from the intermediate portion and respective turning points of the electric terminal.

With the electric terminal having at least partially a cross-section in an elliptical or polygon shape in a fixation portion, the terminal portion may further be secured against a rotational movement with respect to the main direction.

In some embodiments, the electric terminal comprises an opening between the intermediate portion and the counter-connector terminal end, and the opening extends at least partially, which may be as a through opening, through the electric terminal in a direction transverse or inclined to the main direction.

Alternatively or in addition to the at least one shoulder portion, the opening allows a fixation of the electric terminal when being positioned in a fixation portion of the electric terminal as previously addressed and further described in detail with respect to the terminal assembly. For example, the opening may be filled with a mold to form a mold portion to hold the electric terminal in an axial position. A through opening may support a penetration and distribution of the mold in the opening and may also enhance the stability of a respective fixation.

Further, the opening may also prevent a rotational movement of the electric terminal with respect to the main direction.

With the opening extending at least partially in a direction through the electric terminal defining a longitudinal axis, the opening in a direction perpendicular to the longitudinal axis may be entirely disposed within the electric terminal, i.e. entirely enclosed by the material of the electric terminal. For example, a through opening extends from one side of the electric terminal to another side of the electric terminal and forms a channel along the longitudinal axis through the electric terminal. Such channel is entirely enclosed by the material of the electric terminal and opens to two sides of the electric terminal. In other words, the through opening and the channel, respectively, form a through hole in such configuration.

Alternatively, such channel extending along the longitudinal axis being open to at least one side of the electric terminal or two sides as a through opening may also be partially open to another side of the electric terminal. For example, a through opening extends from one side of the electric terminal to another side of the electric terminal and forms a channel along the longitudinal axis through the electric terminal. Such channel may be further open to one lateral side of the electric terminal extending along the longitudinal axis of the channel. In other words, the opening may be formed as a recess in such lateral side.

In some embodiments, the opening is at least partially in an elliptical or polygon shape.

Due to the elliptical or polygon shape, the electrical terminal may be also less prone to tilt around an axis perpendicular to the main direction.

For example, a through opening may be of an elliptical shape and filled by the mold. The elliptical shape when filled prevents the electric terminal from being tilted around the elliptical circumference.

In the event of an opening being partially open to a lateral side of the electric terminal extending along the longitudinal axis, the opening provides at least partially an elliptical or polygon shape around the longitudinal axis, which is arranged within the electric terminal to form an undercut. The undercut is thereby configured to prevent the electric terminal from being tilted around the axis perpendicular to the main direction.

In some embodiments, the opening is disposed between the at least one shoulder portion and the counter-connector terminal end or two shoulder portions according to the at least one should portion or shoulder portions as previously described.

According to such positioning of the opening, the length of a fixation portion of the electric terminal in the main direction may be reduced. Further, with the at least one shoulder portion and the counter-connector terminal end or the two shoulder portions forming an electric terminal portion with an comparably increased diameter or width, the opening may also be increased. An increased opening may further support penetration and distribution of a mold in the opening. Additionally, the mold in the opening may be less prone to break due to a load impact.

The at least one opening and respective features as described above may also be assumed as an inventive concept per se and may therefore form basis for further claims independent from the intermediate portion and respective turning points and/or the at least one shoulder portion of the electric terminal.

In a further aspect, the present invention relates to a terminal assembly for an electric connection of a device in a connector-to-counter-connector configuration, comprising at least one electric terminal, which may be at least one electric terminal as previously described, and a mold portion. The mold portion at least partially encloses the at least one electric terminal in a radial direction with respect to the main direction with the device contact terminal end being exposed from the mold portion in an axial direction with respect to the main direction.

The mold portion thereby provides a fixation of the electric terminal. In other words, the mold portion at least encloses the fixation portion of the at least one electric terminal.

In some embodiments, the counter-connector terminal end is exposed from the mold portion in an axial direction with respect to the main direction on a side of the mold portion facing away from the device contact terminal end.

For example, the counter-connector terminal end may be exposed from the mold portion in an axial direction with respect to the main direction on a side of the mold portion facing away from the device contact terminal end to be received by a socket of a counter connector. Alternatively, the counter-connector terminal end may not be exposed from the mold portion but formed as or connected to a socket in the mold portion to receive a male connector of a counter-connector.

In some embodiments, the intermediate portion at least partially, which may be entirely, extends from a side of the mold portion facing the device contact terminal portion.

Accordingly, the intermediate portion or at least a part thereof is capable of providing a compensation for thermal expansions in the main direction as being exposed and projecting from the mold portion. If the intermediate portion does not entirely extend from the mold portion facing the device contact terminal end and a part of the intermediate portion is embedded by the mold portion, the embedded part of the mold portion, in particular with at least one of the at least turning points being embedded in the mold portion, may further prevent an axial displacement of the electric terminal in the main direction. In such event, a part of the intermediate portion may also be comprised by the fixation portion of the electric terminal.

In some embodiments, a shoulder portion of the electric terminal, which may be the shoulder portion as previously described, is at least partially, which may be entirely, enclosed by the mold portion.

The at least partial enclosure of the shoulder portion corresponds to an at least partial enclosure of the shoulder portion with respect to the surface provided by the shoulder portion due to the different dimensions of the electric terminal in a cross-section perpendicular to the main direction. In other words, the shoulder portion to be at least partially disclosed by the mold portion is a surface facing the device contact terminal end or the counter-connector terminal end in the main direction depending on the position of the shoulder portion. Accordingly, the mold portion prevents the electric terminal from an axial movement in the main direction by an abutment of the respective shoulder portion against the mold portion. In the event of two shoulder portions opposite to each other and each of which being at least partially enclosed by the mold portion, the electric terminal portion comprising the shoulder portions is the fixation portion of the electric terminal. The fixation portion is thus embedded in the mold portion to prevent a bidirectional axial movement of the electric terminal.

In some embodiments, an opening of the electric terminal, which may be the opening according as previously described, is at least partially, which may be entirely, enclosed by the mold portion with the mold at least partially, which may be entirely, filling a space formed by the opening.

Alternatively or in addition to the at least one shoulder portion, the opening may be used as axial fixation of the electric terminal in the mold portion. Accordingly, the fixation portion of the electric terminal at least comprises the opening in such configuration. The fixation portion of the electric terminal may also comprise that at least one shoulder portion and/or a part of the intermediate portion with at least one of the at least two turning points.

In a further aspect, the present invention relates to a connector assembly for an electric connection of a device in a connector-to-counter-connector configuration, comprising a device to be electrically connected to a counter-connector, at least one electric terminal as previously described or at least one terminal assembly as previously described, a connector frame configured to hold the at least one terminal or the at least one terminal assembly in a position with at least one device contact terminal end in contact with an electric contact of the device, and a connector portion comprising at least one counter-connector terminal end.

For example, the terminal assembly may be attached to the connector frame by attaching the mold portion to the terminal frame by gluing, welding, soldering, screwing or any other technique for a form-fit, force-fit and/or firmly bonded connection. Alternatively the at least one electric terminal may be directly affixed to the connector frame. In such event, the connector frame may be a molded frame comprising the mold portion. In other words, the terminal assembly previously described is part of the connector frame.

With the device contact terminal end of the electric terminal being positioned by the connector frame directly or indirectly via the mold portion of the terminal assembly, thermal expansion of the electric terminal in the main direction may cause the device contact terminal end to be pressed against the electric contact of the device. This may cause a damage of the electric terminal, the electrical contact and/or the device. However, with the intermediate portion at least partially extending from the mold portion towards the device, the thermal expansion in the main direction may be at least partially compensated to reduce the risk of a respective damage. Further, with a fixation portion of the electrical terminal held within the mold portion or the connector frame, e.g. provided by at least a part of the intermediate portion, the at least one shoulder portion and/or the opening, the electric terminal is less prone to an axial displacement. Such axial displacement may result from a load impact in the main direction or axial direction, for example, when connecting a counter-connector to the counter-connector terminal end.

In some embodiments, at least one intermediate portion is biased in the main direction between the device and the respective counter-connector terminal end.

The intermediate portion may be biased such that the resulting elastic deformation does still allow further elastic deformation over a predetermined range of elastic deformation for a compensation of thermal expansions. Due to being biased, a contact between the device contact terminal end and the electric contact of the device may be ensured over an enhance range, for example, due to tolerances or thermal shrinkage at excessively low temperatures. In particular with respect to the intermediate portion being at least partially flexible in the main direction, the device contact terminal end may be always urged against the electric contact of the device.

In a further aspect, the present invention relates to a method for manufacturing a terminal assembly as previously described, wherein the at least one electric terminal is molded in the mold portion.

For example, with respect to the opening of the electrical terminal, a manufacturing process by molding may be advantageous to securely hold the electric terminal in the mold portion by the mold easily penetrating the opening.

Further advantages of the method for manufacturing a terminal assembly correspond to advantages already described for the terminal assembly, the electric terminal and/or the connector assembly. Accordingly, any features of the terminal assembly or other components described and associated the terminal assembly may be also considered as features of the method for manufacturing a terminal assembly.

Further advantages, aspects and details of the invention are subject to the claims, the following description of the exemplary embodiments applying the principles of the invention, and drawings.

DETAILED DESCRIPTION

Figure 1:
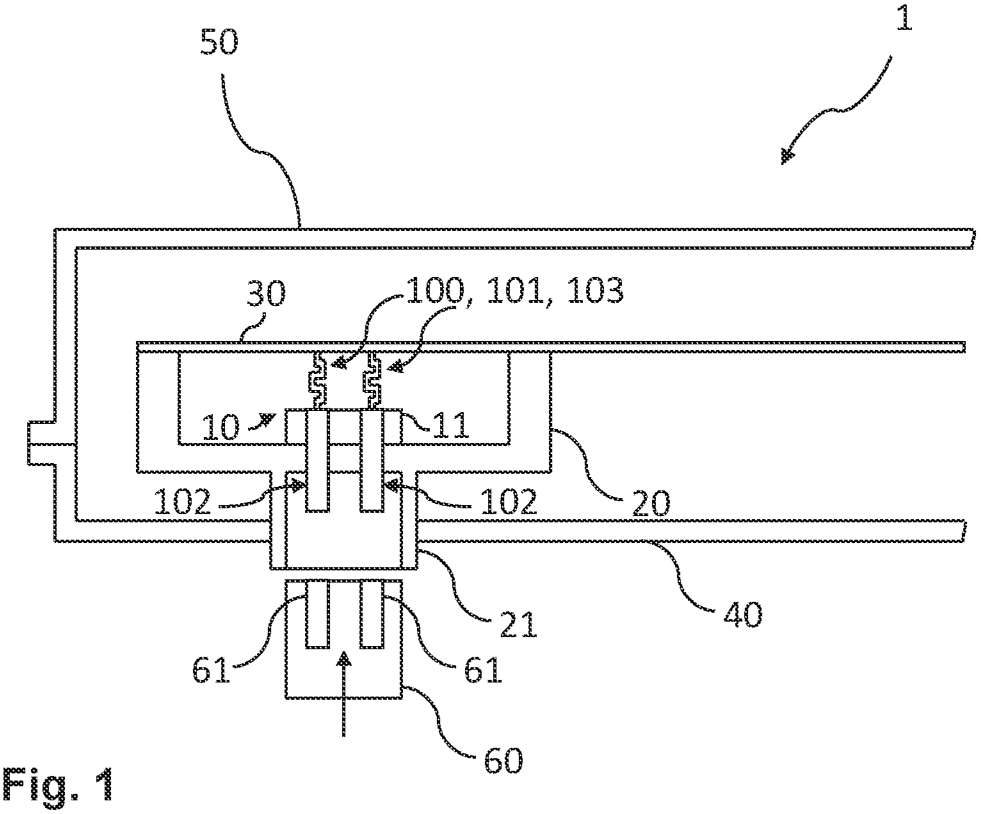
FIG. 1 is a schematic cross-sectional view of a connector assembly according to an exemplary embodiment of the present invention.

FIG. 1 shows a cross-sectional view of a connector assembly 1 according to an exemplary embodiment of the present invention. The connector assembly 1 comprises a terminal assembly 10 with two electric terminals 100 extending in a main direction X (FIG. 2) from a device contact terminal end 101 to a counter-connector terminal end 102 and a mold portion 11. The electric terminals 100 are molded in the mold portion 11 with the respective device contact terminal ends 101 and the counter-connector terminal ends 102 extending therefrom in opposite directions to be exposed from the mold portion 11. In alternative embodiments, the terminal assembly 10 may comprise only one or more than two electric terminals 100. The terminal assembly 10 is affixed to a connector strip 20 as a connector frame to hold the terminal assembly 10 in a predetermined position. In alternative embodiments, the electric terminals 100 may be directly affixed to the connector strip 20 in the same or a comparable functional configuration to form an integral part thereof. The counter-connector terminal ends 102 of the electric terminals 100 are exposed in a connector portion 21 of the connector strip 20 to be received by counter-connector terminal end sockets 61 of a counter connector 60 to be connected to the connector assembly 1. A respective connection direction is indicated by an arrow. The connector assembly 1 further comprises a printed circuit board 30 as an exemplary device to be electrically connected to the counter-connector 60 via the electric terminals 100. For an electric contact between the device contact terminal ends 101 and the printed circuit board 30, the connector strip 20 is affixed to the printed circuit board 30 by soldering and the assembly of the printed circuit board 30 with the connector strip 20 is secured in housing 40 by screws. Accordingly, the connector assembly 1 provides a predetermined positioning of the of device contact terminal ends 101 with respect to electric contacts of the printed circuit board 30. In the exemplary embodiment, the printed circuit board 30 and the connector strip 20 besides the connector portion 21 are enclosed by a connector housing 40 with a top cover 50 to be protected against moisture and other external influences. In alternative embodiments, the enclosure may be an integral part, however, with the enclosure in at least a two-part form an accessibility to respective components within the enclosure may be improved.

Due to the electric connection of the electric terminals 100, the electric terminals 100 may heat up, which results in thermal expansions of the electric terminals 100. With respect to the thermal expansions in the main direction X, in which the electric terminals 100 extend from the device contact terminal end 101 to the counter-connector terminal end 102, the device contact terminal ends 101 of the respective electric terminals 100 exert a compressive force against the respective electric contact of the printed circuit board 30. Due to the compressive force, the electric contacts, the printed circuit board 30 and/or the respective electric terminals 100 may be prone to damages, such as being plastically deformed. A plastic deformation may result in a loose of contact when the temperature decreases with reduction of the thermal expansions. To at least partially compensate thermal expansions in the main direction X, the electric terminals 100 comprise a meander portion 103 as intermediate portion. The meander portion 103 extends from a side of the mold portion 11 facing the printed circuit board 30 in the main direction X towards the device contact terminal end 101. In alternative embodiments, the meander portion may be also partially embedded in the mold portion 11 to provide a resistance against an axial displacement of the respective electric terminal 100, for example, due to an axial force applied when the counter-connector 60 is connected to or disconnected from the connector assembly 1. In the exemplary embodiment, the meander portion 103 comprises three meanders. In alternative embodiments, the meander portion 103 may provide less or more than three meanders. The meander portion 103 is flexible, i.e. elastically deformable, in the main direction X. In the connector assembly 1 according to the exemplary embodiment, the meander portion 103 is biased in the main direction X when the electric terminals 100 and the device contact terminal ends 101, respectively, are positions in contact with the electric contacts of the printed circuit board 30 by the connector strip 20. Accordingly, the a close contact between the respective device contact terminal ends 101 and the electric contacts of the printed circuit board 30 is supported by the respective biased meander portions 103. When thermal expansions in the main direction occur, the meander portion 103 is compressed in the main direction X to compensate for such expansions.

In other words, the distance between portions of the meanders deviating from the main direction X and facing each other is reduced.

Figure 2:
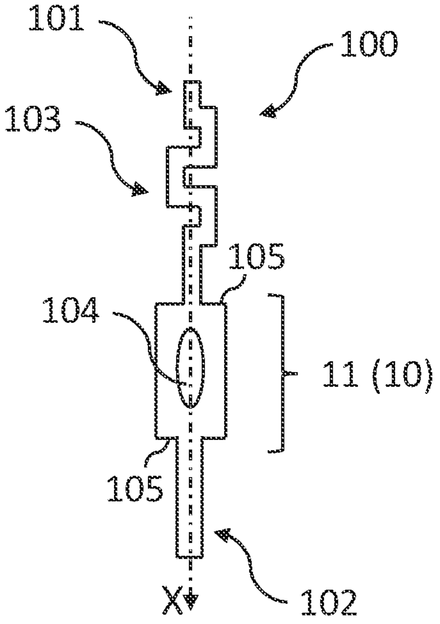
FIG. 2 is a schematic front view of an electric terminal according to a first exemplary embodiment as per FIG. 1.

FIG. 2 shows a schematic front view of the electric terminal 100 according to a first exemplary embodiment as shown in FIG. 1. As addressed before, the electric terminal 100 extends from the device contact terminal end 101 to the counter-connector terminal end 102 in the main direction X. The electric terminal 100 comprises the meander portion 103 between the device contact terminal end 101 and a portion of the electric terminal 100 to be embedded in the mold portion 11 of the terminal assembly 10 is indicated by the bracket with the respective reference signs. Starting from the device contact terminal end 101, the electric terminal 100 extends in the main direction X with the intermediate portion 103 comprising a first turning point to deflect the electric terminal in a direction perpendicular to the main direction X. According to a subsequent second turning point, the electric terminal is deflected to extend again in the main direction X away from the device contact terminal end 101. In a third turning point, the electric terminal 100 is deflected again to extend in a direction perpendicular to the main direction X to form a meander. The deflections are repeated to form three meanders in total according to a further fourth, fifth, sixth, seventh and eighth turning point. In the exemplary embodiment, the main direction X provides a symmetry axis with respect to the three meanders. Due to the dimensions and material selection, the portions of the meanders perpendicular to the main direction X are elastically flexed towards each other when a thermal expansion in the main direction X occurs to at least partially compensate the thermal expansion of the portions of the meanders in the main direction X. If the temperature decreases again, the portions of the meanders perpendicular to the main direction X flex back due to their elasticity to keep the device contact terminal end in contact with the electric contact of the printed circuit board.

The electric terminal 100 shown in FIG. 2 further comprises two shoulder portions 105 between the meander portion 103 and the counter-connector terminal end 102. Starting from the meander portion 103, the width of the electric terminal 100 in a direction perpendicular to the main direction X is increased on two opposing sides of the electric terminal. In alternative embodiments, the width of the electric terminal 100 in a direction perpendicular to the main direction X is increased on only one side, on more than two sides or on two sides not opposed to each other. Due to the increase in width, the first shoulder portion 105 is formed. The second shoulder portion 105 facing the counter-connector terminal end is formed opposed to the first should portion 105 by decreasing the width of the electric terminal 100 from the enlarged width back to a reduced width. The portion of the electric terminal 100 between the two shoulder portions is positioned to be embedded in the mold portion 11 of the terminal assembly 10. When the shoulder portions 105 are embedded in the mold portion 11, the shoulder portions 105 abut against the mold in the main direction and the electric terminal 100 is thereby prevented from being axially displaced in the mold portion 11 with respect to the main direction X. Accordingly, the portion of the electric terminal 100 between the two shoulder portions 105 provides a fixation portion.

To further secure the electric terminal 100 in the mold portion 11 against an axial displacement, the electric terminal 100 comprises a through opening 104 to be filled with mold when the electric terminal 100 is embedded in the mold portion 11. The opening 104, when filled with the mold, does also prevent a rotational movement around an axis corresponding to the main direction X. In the exemplary first embodiment of the electric terminal 100, the opening 104 is oval or elliptical to further secure the electric terminal 100 against a rotational displacement with respect to an axis perpendicular to the main direction X. Further, the opening 104 is a through opening extending from one side of the electric terminal 100 to the other side of the electric terminal 100 in a longitudinal direction and longitudinal axis of the opening 104, respectively, as a channel. The channel formed by the opening 104 is entirely enclosed be the electric terminal 100 in a radial direction with respect to the longitudinal axis.

Figure 3:
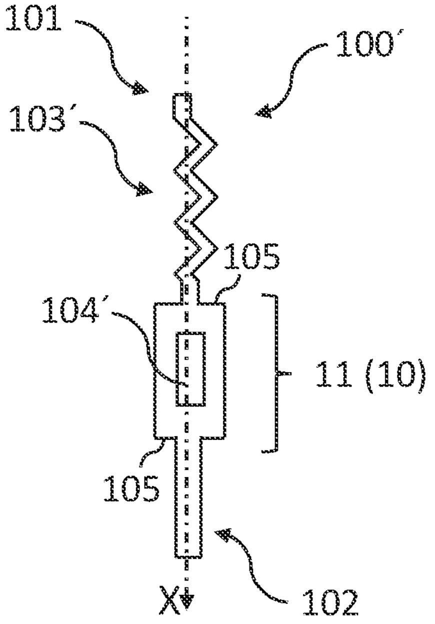
FIG. 3 is a schematic front view of an electric terminal according to a second exemplary embodiment.

FIG. 3 shows a schematic front view of an electric terminal 100 according to a second exemplary embodiment. The second embodiment differs from the first embodiment in the formation of a meander portion 103' and an opening 104'. Other features of the electric terminal 100' correspond to the first embodiment. Accordingly, these features show the same reference signs as per the first embodiment and a description thereof according to the first embodiment also applies for the second embodiment.

The meander portion 103' of the electric terminal 100' provides a zigzag-shape with eight turning points. Accordingly, the turning points provide deflections different from 90° with each portion of the electric terminal 100' between two turning points crossing the main direction X. Further the opening 104' is formed as a polygon, here, a rectangle.

Figure 4:
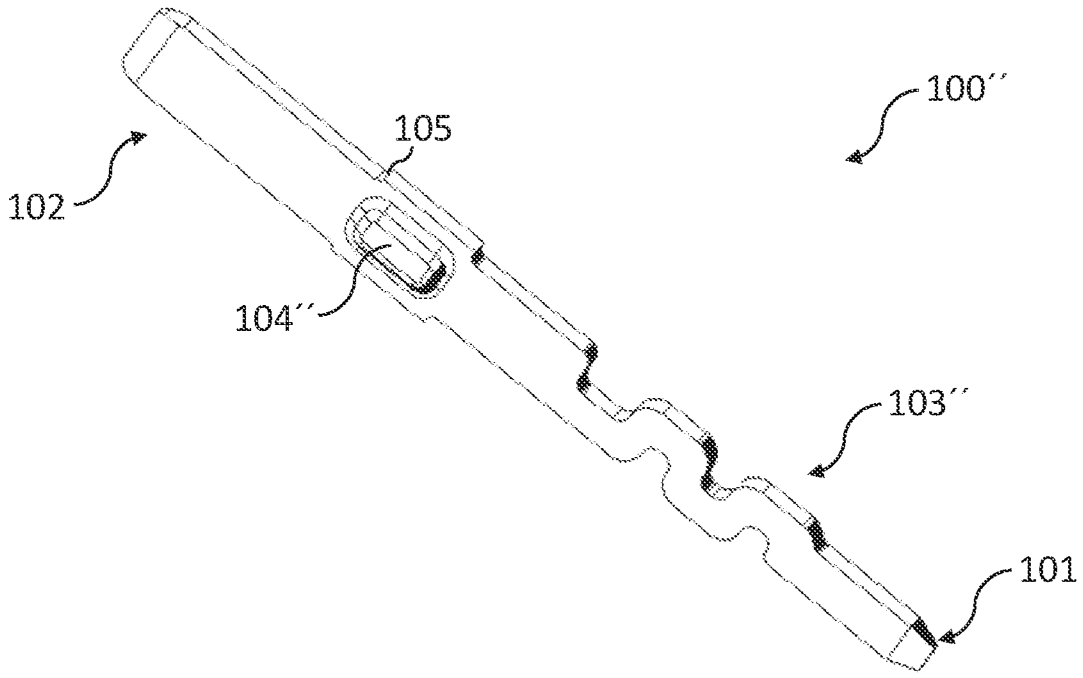
FIG. 4 is a perspective view of an electric terminal according to a third exemplary embodiment.

FIG. 4 shows a perspective view of an electric terminal 100" according to a third exemplary embodiment. The third embodiment differs from the first and second embodiment in the formation of a meander portion 103" and an opening 104". Other features of the electric terminal 100" correspond to the first and second embodiment. Accordingly, these features show the same reference signs as per the first and second embodiment and a description thereof according to the first embodiment also applies for the third embodiment.

The meander portion 103' of the electric terminal 100" according to the third embodiment corresponds to the meander portion 103 of the electric terminal 100 according to the first embodiment.

However, the opening 104" of the electric terminal 100" according to the third embodiment differs from the opening 104 and opening 104' of the first embodiment and second embodiment, respectively, by being formed by a punch to create a hollow space. However, the opening 104" as punch may also be applicable to the first, second or other embodiments alternatively or in addition to the respective openings 104, 104' and/or other openings of further embodiments. The punch also forms a protrusion on the other side of electric terminal 100" opposed to the entry of the punch tool. When the respective portion of the electric terminal comprising the opening 104" is over molded, mold material flows into the hollow space. Accordingly, the electric terminal 100" is held in the mold by the mold within the hollow space as well as be the protrusion. The electric terminal 100" is thereby prevented from an axial and radial relative movement with respect to the mold.

Figure 5:
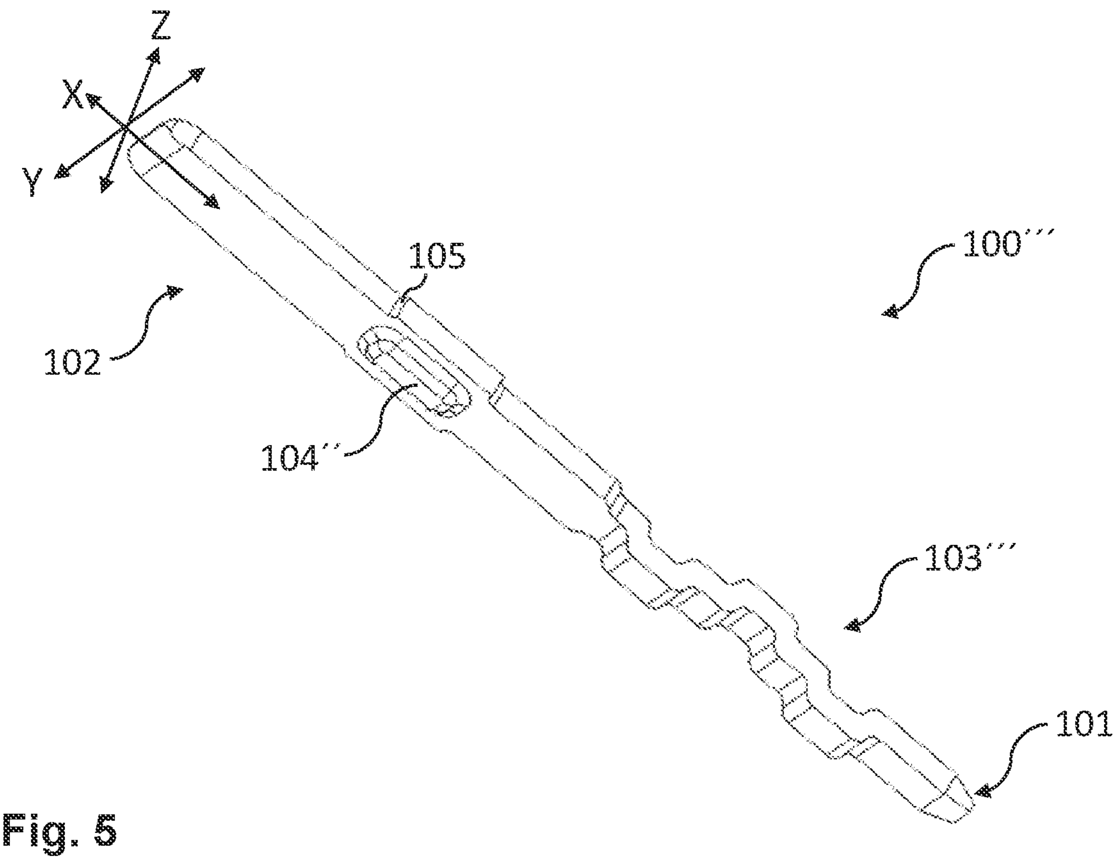
FIG. 5 is a perspective view of an electric terminal according to a fourth exemplary embodiment.

FIG. 5 shows a perspective view of an electric terminal 100'" according to a fourth exemplary embodiment. The fourth embodiment differs from the first, second and third embodiment in the formation of a meander portion 103'". Other features of the electric terminal 100'" correspond to the first, second or embodiment. Accordingly, these features show the same reference signs as per the first, second or third and a description thereof according to the first embodiment and third embodiment also applies for the fourth embodiment.

The meander portion 103'" of the electric terminal 100'" according to the fourth embodiment is similar to the meander portion 103 of the electric terminal 100 according to the first embodiment and the meander portion 103" of the third embodiment but rotated by 90 degrees with respect to the meander portion 103 of the first embodiment. An arrangement with the meander portion being rotated by 90 degrees to extend in the Z direction may also be applicable to the other embodiments. The meander portion 103'" is pressed or formed by pushing of tools. However, the meander portion 103'" or meander portions of alternative embodiments, such as the first embodiment, may be formed by stamping or cutting of the pin.

Further, while the deflections in a direction different from the main direction X of the meander portions 103, 103', 103" in the other embodiments extending in a direction of the largest extension of the electric terminals 100, 100', 100" perpendicular to the main direction X as a width direction Y of the electric terminals 100, 100', 100", the deflections in a direction different from the main direction X of the meander portion 103'" in the fourth embodiment extend in a direction of the shortest extension of the electric terminal 100'" perpendicular to the main direction X as a depth direction Z of the electric terminal 100'". In alternative embodiments, the deflections of the meander portion 103'" may also alternatively or in addition extend in the width direction Y of the electric terminal 100'" and the deflections of the meander portions 103, 103', 103" may also alternatively or in addition extend in the depth direction Z of the electric terminals 100, 100', 100".

Figure 6:
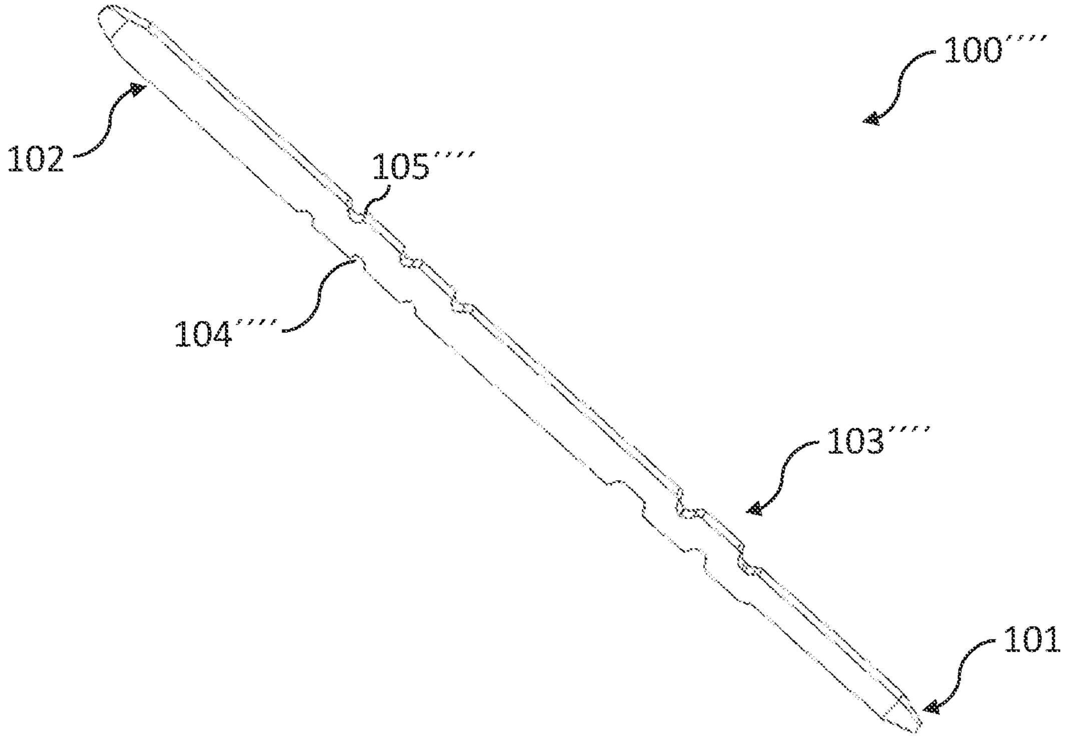
FIG. 6 is a perspective view of an electric terminal according to a fifth exemplary embodiment.

FIG. 6 shows a perspective view of an electric terminal 100"" according to a fifth exemplary embodiment. The fifth embodiment differs from the first, second, third and fourth embodiment in the formation of a meander portion 103"", openings 104"" and an meander portion 103"". Other features of the electric terminal 100'" correspond to the other embodiments. Accordingly, these features show the same reference signs as per the first, second, third or fourth and a description thereof according to these embodiment also applies for the fourth embodiment.

The meander portion 103"" of the electric terminal 100"" according to the fifth embodiment is similar to the meander portion 103" of the electric terminal 100" according to the third embodiment. However, the electric terminal 100"" is comparably narrow in the main direction X with respect to the other embodiments. Due to the narrow configuration of the electric terminal 100"", the electric terminal 100"" is particularly applicable under critical space constraints. The functionalities of the meander portion 103"" and of the openings 104"" corresponds to the functionalities as described for the other embodiments.

Specifically, the electric terminal 100"" comprises several openings 104"" formed as recesses opened to in the width direction Y. The openings 104"" and recesses, respectively, are formed to provide an undercut in a plane defined by the main direction X and the width direction Y.

As the openings 104"" are opened to a respective side of the electric terminal 100"" in the width direction Y, the openings 104"" also form shoulder portions 105"". The plurality of openings 104"" and therefore shoulder portions 105"" are disposed on opposed sides of the electric terminal 100"" in the width direction Y. Further, the openings 104"" and therefore the shoulder portions 105"" of opposed sides of the electric terminal 100"" are alternately arranged along the main direction X, i.e. an opening 104"" on one side is followed by an opening 104"" on the other side along the main direction X.

The invention has been described in with respect to exemplary embodiments. However, the invention is not limited to the exemplary embodiments. In particular, the shape of the meander portions 103, 103', 103", 103'", 103"" and the openings 104, 104', 104", 104"" according to the first, second, third, fourth and fifth embodiments of the electric terminals 100, 100', 100", 100'", 100"" are to be assumed as independent and may therefore be combined or mutually exchanged. In particular, the electric terminals 100, 100', 100", 100'", 100"" may comprise several openings 104, 104', 104", 104"" between the shoulder portions 105, 105' or with at least one opening 104, 104', 104", 104"" outside the shoulder portions 105, 105'. Further, any given angle of deflection may be adaptable. For example, the meanders formed in the first embodiment may not or not always provide deflections of 90° in the respective turning points.

THE LIST OF REFERENCE SIGNS IS AS FOLLOWS

1 connector assembly
10 terminal assembly
11 mold portion
20 connector strip (connector frame)
30 connector portion
40 printed circuit board (device)
40 connector housing
50 top cover
60 counter-connector
61 counter-connector terminal end socket
100, 100', 100", 100'", 100"" electric terminal
101 device contact terminal end
102 counter-connector terminal end
103, 103, 103", 103'", 103"" meander portion (intermediate portion)
104, 104', 104", 104"" opening
105, 105"" shoulder portion
X main direction
Y width direction
Z depth direction

What is claimed is:

1. An electric terminal for an electric connection of a device in a connector-to-counter-connector configuration, comprising:
a device contact terminal end;
a counter-connector terminal end; and
an intermediate portion between the device contact terminal end and the counter-connector terminal end;
wherein the electric terminal extends from the device contact terminal end to the counter-connector terminal end in a main direction, and
wherein the intermediate portion includes at least two turning points to deflect the extension of the electric terminal at least once from the main direction, and wherein the intermediate portion is a meander portion having at least one meander deflecting the extension of the electric terminal away from and back towards the main direction;
wherein the electric terminal further includes a further portion between the meander portion and the counter-connector terminal end, the further portion having an opening, wherein the opening extends at least partially through the electric terminal in a direction transverse or inclined to the main direction, and is entirely circumferentially enclosed by a material of the electric terminal, wherein the opening is disposed between at least two shoulder portions which project in a radial outward direction with respect to the main direction, a first shoulder portion of the at least two shoulder portions being at a first end of the further portion adjacent to the meander portion, and a second shoulder portion of the at least two should portions being a second end of the further portion, opposite to the first end, and adjacent to the counter-connector terminal end.

2. The electric terminal of claim 1, wherein the intermediate portion is at least partially flexible in the main direction.

3. The electric terminal of claim 1, wherein the device contact terminal end and the counter-connector terminal end are on the same axis extending in parallel to the main direction.

4. The electric terminal of claim 1, wherein the opening is at least partially in an elliptical or polygon shape.

5. The electric terminal of claim 1, wherein the device contact terminal end and the counter-connector terminal end are on the same axis extending in parallel to the main direction.

6. A terminal assembly for an electric connection of a device in a connector-to-counter-connector configuration, comprising:
at least one electric terminal, including:
a device contact terminal end,
a counter-connector terminal end, and
an intermediate portion between the device contact terminal end and the counter-connector terminal end,
wherein the electric terminal extends from the device contact terminal end to the counter-connector terminal end in a main direction,
wherein the intermediate portion includes at least two turning points to deflect the extension of the electric terminal at least once from the main direction, and wherein the intermediate portion is a meander portion having at least one meander deflecting the extension of the electric terminal away from and back towards the main direction, and
wherein the electric terminal further includes a further portion between the meander portion and the counter-connector terminal end, the further portion having an opening, wherein the opening extends at least partially through the electric terminal in a direction transverse or inclined to the main direction, and is entirely circumferentially enclosed by a material of the electric terminal, wherein the opening is disposed between at least two shoulder portions which project in a radial outward direction with respect to the main direction, a first shoulder portion of the at least two shoulder portions being at a first end of the further portion adjacent to the meander portion, and a second shoulder portion of the at least two should portions being a second end of the further portion, opposite to the first end, and adjacent to the counter-connector terminal end; and
a mold portion;
wherein the mold portion at least partially encloses the at least one electric terminal in a radial direction with respect to the main direction with the device contact terminal end being exposed from the mold portion in an axial direction with respect to the main direction.

7. The terminal assembly of claim 6, wherein the counter-connector terminal end is exposed from the mold portion in an axial direction with respect to the main direction on a side of the mold portion facing away from the device contact terminal end.

8. The terminal assembly of claim 6, wherein the intermediate portion at least partially or entirely extends from a side of the mold portion facing the device contact terminal portion.

9. The terminal assembly of claim 6, wherein the at least two shoulder portions are at least partially or entirely enclosed by the mold portion, and wherein the device contact terminal end and the counter-connector terminal end are on the same axis extending in parallel to the main direction.

10. The terminal assembly of claim 6, wherein the opening is at least partially or entirely enclosed by the mold portion with the mold at least partially or entirely filling a space formed by the opening.

11. A connector assembly for an electric connection of a device in a connector-to-counter-connector configuration, comprising:

a device electrically connectable to a counter-connector;
at least one terminal assembly, including:
at least one electric terminal, including:
a device contact terminal end,
a counter-connector terminal end, and
an intermediate portion between the device contact terminal end and the counter-connector terminal end,
wherein the electric terminal extends from the device contact terminal end to the counter-connector terminal end in a main direction,
wherein the intermediate portion includes at least two turning points to deflect the extension of the electric terminal at least once from the main direction,
wherein the electric terminal includes an opening between the intermediate portion and the counter-connector terminal end, and wherein the opening extends at least partially through the electric terminal in a direction transverse or inclined to the main direction, and wherein the counter-connector terminal end is configured to be positioned in electrical contact with a counter-connector contact; and
a mold portion;
wherein the mold portion at least partially encloses the at least one electric terminal in a radial direction with respect to the main direction with the device contact terminal end being exposed from the mold portion in an axial direction with respect to the main direction;
a connector frame configured to hold the at least one terminal assembly in a position with at least one device contact terminal end in contact with an electric contact of the device; and
a connector portion having at least one counter-connector terminal end.

12. The connector assembly of claim 11, wherein at least one intermediate portion is biased in the main direction between the device and the respective counter-connector terminal end.

13. A method for manufacturing a terminal assembly terminal assembly for an electric connection of a device in a connector-to-counter-connector configuration, the method comprising:
molding the at least one electric terminal in a mold portion;
wherein the at least one electric terminal includes:
a device contact terminal end;
a counter-connector terminal end; and
an intermediate portion between the device contact terminal end and the counter-connector terminal end;
wherein the electric terminal extends from the device contact terminal end to the counter-connector terminal end in a main direction, and
wherein the intermediate portion includes at least two turning points to deflect the extension of the electric terminal at least once from the main direction, and
wherein the intermediate portion is a meander portion having at least one meander deflecting the extension of the electric terminal away from and back towards the main direction;
wherein the electric terminal further includes a further portion between the meander portion and the counter-connector terminal end, the further portion having an opening, wherein the opening extends at least partially through the electric terminal in a direction transverse or inclined to the main direction, and is entirely circumferentially enclosed by a material of the electric terminal, wherein the opening is disposed between at least two shoulder portions which project in a radial outward direction with respect to the main direction, a first shoulder portion of the at least two shoulder portions being at a first end of the further portion adjacent to the meander portion, and a second shoulder portion of the at least two should portions being a second end of the further portion, opposite to the first end, and adjacent to the counter-connector terminal end; and
the mold portion;
wherein the mold portion at least partially encloses the at least one electric terminal in a radial direction with respect to the main direction with the device contact terminal end being exposed from the mold portion in an axial direction with respect to the main direction.

14. The electric terminal of claim 1, wherein the device contact terminal end and the counter-connector terminal end are on the same axis extending in parallel to the main direction, which is a symmetry axis of the at least one meander.

15. The electric terminal of claim 1, wherein the opening is a through opening.

16. The electric terminal of claim 1, wherein starting from the meander portion, a width in a direction perpendicular to the main direction of the electric terminal is increased to an enlarged width to form the first shoulder portion, and the second shoulder portion is formed by decreasing the enlarged width to a reduced width at the counter-connector end.

17. The terminal assembly of claim 6, wherein starting from the meander portion, a width in a direction perpendicular to the main direction of the electric terminal is increased to an enlarged width to form the first shoulder portion, and the second shoulder portion is formed by decreasing the enlarged width to a reduced width at the counter-connector end.

18. The method of claim 13, wherein starting from the meander portion, a width in a direction perpendicular to the main direction of the electric terminal is increased to an enlarged width to form the first shoulder portion, and the second shoulder portion is formed by decreasing the enlarged width to a reduced width at the counter-connector end.

* * * * *